United States Patent [19]

Merving

[11] Patent Number: 5,485,698
[45] Date of Patent: Jan. 23, 1996

[54] TREE TREATMENT CAPSULE WITH RADIALLY EXPANDING SHANK PORTION

[76] Inventor: Hans A. K. Merving, August Stalbergsvag 10A, 644 00 Torshalla, Sweden

[21] Appl. No.: 559,938

[22] Filed: Jul. 30, 1990

Related U.S. Application Data

[63] Continuation-in-part of Ser. No. 555,734, Jul. 23, 1990, Pat. No. 5,207,021, which is a continuation-in-part of Ser. No. 410,884, Sep. 22, 1989, Pat. No. 5,010,684, which is a continuation-in-part of Ser. No. 393,841, Aug. 7, 1989, Pat. No. 4,905,410, which is a continuation of Ser. No. 184,072, Apr. 20, 1988, abandoned.

[51] Int. Cl.$^6$ ............................................. A01G 29/00
[52] U.S. Cl. ....................................................... 47/57.5
[58] Field of Search ...................................... 47/57.5

[56] References Cited

U.S. PATENT DOCUMENTS 5,010,684  4/1991  Merving ..................... 47/57.5

Primary Examiner—Terry Lee Melius
Assistant Examiner—Joanne C. Downs
Attorney, Agent, or Firm—Keck, Mahin & Cate

[57] ABSTRACT

A tree treatment capsule is disclosed as including a plastic container having a shank with an internal cavity for containing therein a chemical agent and a head integrally formed with the shank portion. A plastic plug is provided to sealingly close the cavity. The shank has a plurality of slots which are formed in the exterior surface thereof and extend lengthwise of the shank. The slots allow the shank to be broken so that when an impact force is applied to the head to move the head towards the plastic plug, the plastic plug expands and breaks the shank along the slots into strips to form passages between the strips. The passages allow the chemical agent to pass from the cavity of the capsule through the passages and mix with sap of the tree.

10 Claims, 2 Drawing Sheets

TREE TREATMENT CAPSULE WITH RADIALLY EXPANDING SHANK PORTION

This application is a Continuation-in-Part of U.S. patent application Ser. No. 07/555,734, filed Jul. 23, 1990, now U.S. Pat. No. 5,207,021, which is a Continuation-in-Part of U.S. patent application Ser. No. 07/410,884, filed Sep. 22, 1989, now U.S. Pat. No. 5,010,684, which is a Continuation-in-Part of U.S. patent application Ser. No. 07/393,841, filed Aug. 7, 1989, now U.S. Pat. No. 4,905,410, which in turn is a Continuation of U.S. patent application Ser. No. 07/184,072, filed Apr. 20, 1988, now abandoned.

FIELD OF THE INVENTION

The present invention relates to a tree treatment capsule for feeding a chemical agent into plants and, more particularly, to a capsule for delivering a chemical agent to the phloem layer of a tree. The chemical agent may be either a herbicide or any other tree destroying agent the treatment is designed to kill the tree, or a fertilizer, fungicide or other medicant or nutrient if the treatment is designed to cure the tree from a disease or a nutrient deficiency.

BACKGROUND OF THE INVENTION

Heretofore, tree treatment capsules consisting of a generally cylindrical hollow container and a plug for insertion into a pre-drilled hole in a tree to be treated have been known. Such tree treatment capsules have typically been made of a frangible material, or of a hard, brittle, breakable and non-elastic material, such as fiberglass, wood or wood fiber. However, the hollow containers of these known capsules tend to be breakable before they are assembled or even after assembly upon inadvertent application of an external impact.

Tree treatment capsules made of a brittle, breakable plastic material are also known. However, although it is difficult to break such capsules before usage, it is also difficult to break them when they are in use. Consequently, a great deal of force must be applied to provide a Large enough impact to cause the capsule to break.

SUMMARY OF THE INVENTION

It is, therefore, an object of the present invention to provide a tree treatment capsule which is difficult to accidentally break before usage, and yet which is easily breakable when an axial impact force is applied.

It is also an object of the present invention to provide a capsule which releases a treating chemical more precisely into the phloem layer of a tree, and to provide an improved connection between capsule parts.

According to the present invention, a tree treatment capsule is adapted for insertion into a bore of a tree to be treated and includes a plastic container and a plastic plug to sealingly close the container. The plastic container has a cylindrical shank having an internal cavity formed with an end opening for containing therein a chemical agent, and a head integrally formed with the shank remote from the end opening. A plastic plug is partially insertable into the end opening and includes a circumferential ridge thereon receivable in a corresponding recess formed in the shank in order to obtain a tight fit between the plug and the end opening of the cavity.

The shank has a plurality of recessed slots which are formed in the exterior surface thereof at circumferentially equal spacings. The scorings extend longitudinally along a central portion of the shank. The recessed scorings allow the shank to be broken so that as an impact force applied to the head moves the head towards the plastic plug, the plastic plug expands the central portion of the shank and breaks the shank along the recessed slots into a plurality of strips, thereby providing passages between the separated strips through which the chemical agent is allowed to pass from the internal cavity of the capsule. The chemical agent passed from the capsule through the passages then mixes with sap of the tree.

The plastic container and plastic plug are preferably made of different plastic materials in order to permit the shank element to be easily broken when an impact force is applied to the head element and moves the shank element towards the plastic plug.

DESCRIPTION OF THE PREFERRED EMBODIMENT

Figure 1:
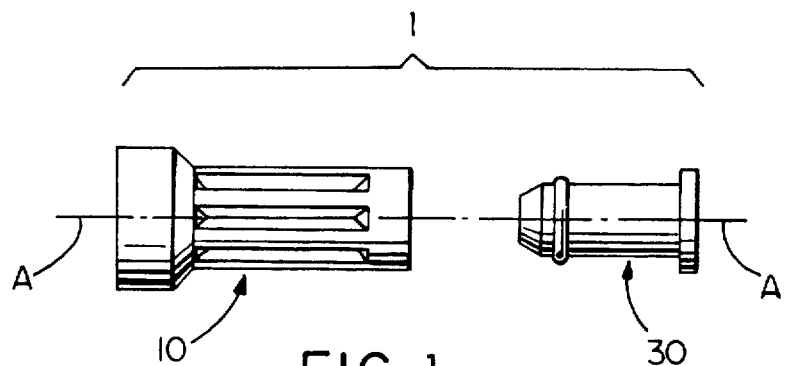
FIG. 1 is an exploded view of a tree treatment capsule in accordance with a preferred embodiment of the present invention.

Referring to the drawings, in particular to FIG. 1, the present invention is embodied in a tree treatment capsule 1 adapted for insertion into a pre-drilled bore in the trunk of a tree to be treated. The capsule 1 comprises a generally cylindrical plastic container 10 and a generally cylindrical, hollow plastic plug 30. Container 10 and plug 30 are initially formed separate from each other, but when capsule 1 is assembled, container 10 and plug 30 are secured together and share a common longitudinal axis A.

Figure 2:
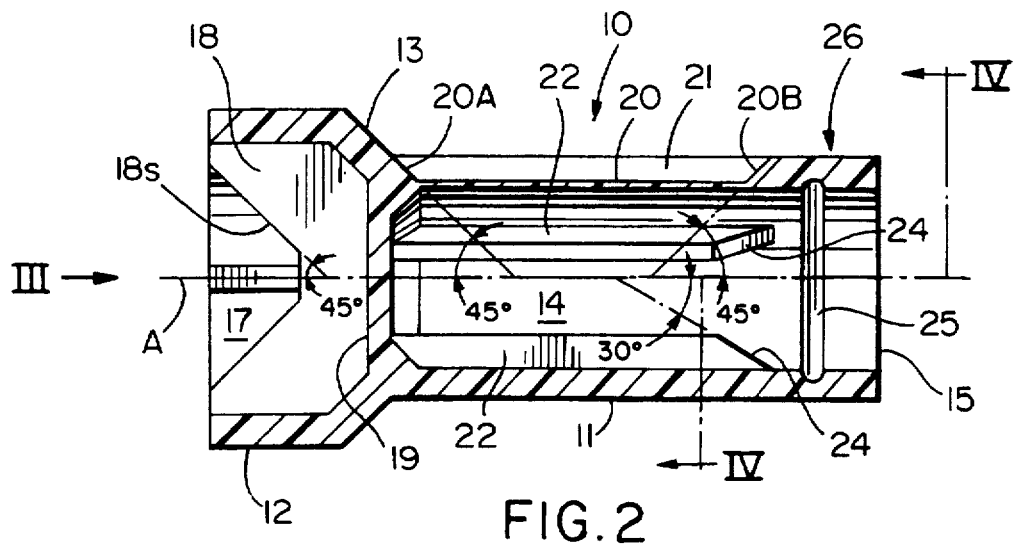
FIG. 2 is a side sectional view of a container of the tree treatment capsule of FIG. 1.
Figure 3:
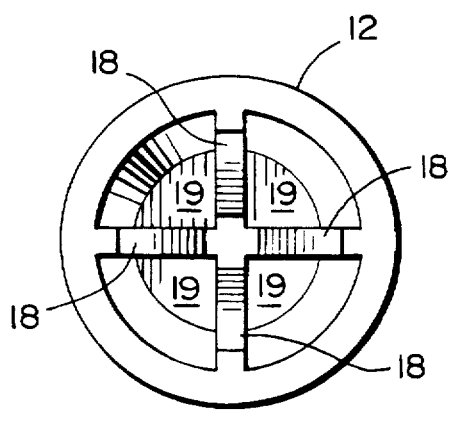
FIG. 3 is an end of the container of FIG. 2 as it appears when viewed in the direction of arrow III.
Figure 4:
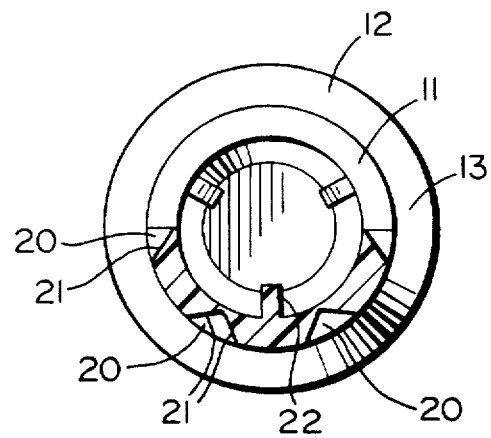
FIG. 4 is an end view, partly in section, of the container of FIG. 2 as seen along section line IV—IV.

Referring now to FIGS. 2–4, it may be seen that the cylindrical container 10 includes a cylindrical, hollow shank portion 11 having a cylindrical, hollow head element 12 rigidly joined thereto by a conically tapered, solid transition portion 13. The head element 12 has an outer diameter larger than an outer diameter of the shank portion 11.

The shank portion 11 is formed as a circumferential wall having radially inner and outer surfaces. Shank portion 11 encircles an internal cavity 14 and has a first, open end 15 defining an end opening to the cavity, into which a tree treating chemical agent (not shown) is placed. The head element 12 also forms an open ended internal cavity 17, in which ribs 18 are integrally formed with the head element 12. Ribs 18 extend crosswise in cavity 17 in order to provide a lightweight and yet strongly reinforced structure to the hollow head element 12. As is apparent from FIG. 2, the axially outer surface 18s of each rib 18 is angled at about 45° relative to longitudinal axis A. Internal cavities 14 and 17 are separated by a partition 19. Partition 19 thus closes a second end of the shank portion opposite the first, open end 15.

The shank portion 11 has a series of, for example six, equally circumferentially spaced, recessed slots 20 formed in the exterior, radially outer surface thereof. These recessed slots 20 longitudinally extend along the shank portion 11 from the junction between transition portion 13 and head element 12 towards open end 15 of the shank portion. As illustrated, recessed slots 20 extend longitudinally along the exterior of shank portion 11 over approximately 80% of the length of the shank portion. As is apparent from FIG. 4, each of the recessed slots is formed by a pair of side walls 21 which diverge from each other at an angle of approximately 90°. Additionally, longitudinally opposite ends 20A and 20B of each slot 20 are each angled at approximately 45° relative to the longitudinal axis A. Recessed slots 20 are sufficiently deep so as to make the shank portion easily breakable along the slots, as will be described.

Shank portion 11 is additionally provided with a plurality of ribs 22. As is apparent from FIGS. 2 and 4 of the drawings, ribs 22 are integrally formed with the rest of the shank portion 11 and extend radially inwardly into cavity 14 from the inner surface of the shank portion. Each rib extends longitudinally along the radially inner surface of shank portion 11 so as to be substantially coextensive with, or equal in length to, recessed slots 20. Referring to FIG. 4, it can be seen that each rib 22 is provided at a circumferential location which is midway between adjacent recessed slots 20. It should be noted, however, that it is not necessary to provide a rib 22 midway between every pair of adjacent recessed slots 20. As illustrated, three ribs 22 are provided on the radially inner surface of the shank portion at 120° intervals, and at locations between every other pair of adjacent slots 20. Each rib 22 is also provided with an inclined end surface 24 which is oriented at approximately 30° relative to the longitudinal central axis A of the capsule 1. The shank portion 11 additionally includes a circumferential recess 25 provided in the radially inner surface of shank portion 11 at a location which, in the direction of longitudinal axis A of capsule 1, is intermediate the ends of slots 20 and ribs 22 and the first, open end 15 of shank portion 11o This location, which is generally designated by reference number 26 in FIG. 2, is substantially more rigid then the remainder of the portion 11, due to the absence in the location of slots 20.

Figure 5:
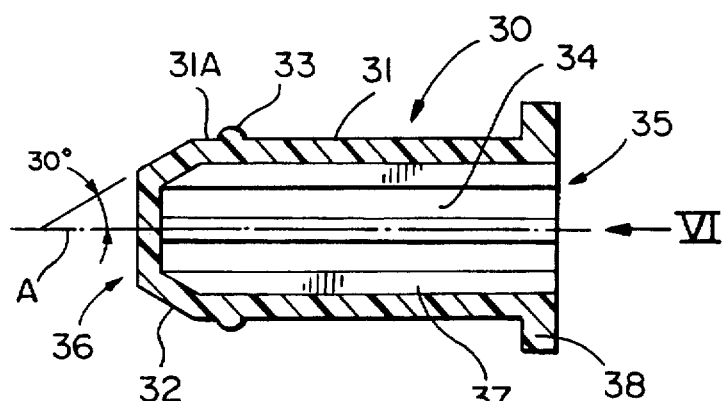
FIG. 5 is a side sectional view of a plug of the tree treatment capsule of FIG. 1.
Figure 6:
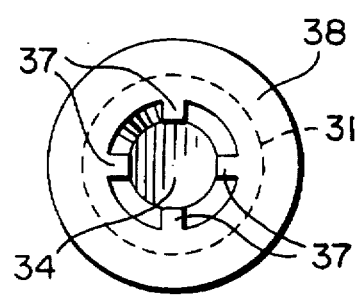
FIG. 6 is an end view of the plug of FIG. 5 as it appears when viewed in the direction of arrow VI.

Referring to FIGS. 5 and 6, it is apparent that the plug 30 is formed with an internal cavity 34 having a first, open end, generally designated 35 and second, closed end, generally designated 36. The plug 30 includes a cylindrical portion 31 and a tapered or inclined portion 32. As illustrated, portion 32 is substantially conical. The cylindrical portion 31 has nearly the same outer diameter as the inner diameter of the shank portion 11 so that end part 31A of the cylindrical portion 31 is snugly received within cavity 14 when the capsule 1 is fully assembled. At its first longitudinal end, the cylindrical portion is integrally connected to the conical portion 32. At its second longitudinal end, cylindrical portion 31 is provided with an annular flange 38 projecting radially outwardly from the cylindrical portion.

Conical portion 32 of plug 30 has an outer surface which is angled, relative to central axis A, at approximately 30°. As will become clear, because the outer surface of conical portion 32 has the same angle relative to longitudinal axis A as end surfaces 24 of ribs 22, conical portion 32 tightly engages inclined end surfaces 24 of ribs 22 when the capsule 1 is fully assembled. A circumferentially protruding ridge 33 is provided on the outer surface of cylindrical portion 31 at a location adjacent the first longitudinal end of the plug. As will become clear, when capsule 1 is assembled, ridge 33 of plug 30 interlocks with recess 25 in the radially inner surface of shank portion 11 to secure plug 30 in open end 15 of the shank portion. The plug 30 also has a series of, for example four, reinforcing ribs 37 integrally formed with and on the circumferentially internal surface of the cylindrical portion 31 to provide a strong plug structure. Ribs 37 are preferably arranged at equal circumferential spacings, as is shown in FIG. 3. These ribs 37 extend longitudinally from the open end 35 of the plug 30 along the radially inner surfaces of cylindrical portion 31 and conical portion 32. Ribs 37 terminate at the junction between conical portion 32 and a front end wall 33 of the plug. In the illustrated embodiment, the cooperating inclined surfaces 24 of the ribs 22 and of the conical portion 32 of plug 30 are shown as being straight; however, surface 24 and portion 32 could be curved if desired.

All portions of the capsule 1 are made of brittle plastic materials by, for example, injection molding or extrusion molding. It is specifically preferred to make the container 10 of polystyrene or polycarbonate and the plug 30 of polyethylene. Making the container 10 and plug 30 of these different plastic materials enables the container 10 to be broken more easily than plug 30.

In assembling the capsule 1, the chemical agent is introduced into the cavity 14 of the container 10 and the plug 30 is inserted into open end 15 of the container 10. Plug 30 is forced into the open end until ridge 33 snaps into engagement and is completely received in recess 25. The end part 31A of cylindrical portion 31 tightly fits in the open end 15 and the inclined, conical portion 33 tightly engages the inclined end surfaces 24 of ribs 22. Ridge 33 is completely received in and tightly engaged with recess 25 to completely seal off the open end 15 of container 10. An improved connection between capsule parts, i.e. container 10 and plug 30, is therefore provided. Although a tight fit is obtained between the plug 30 and the container 10 due to the interengagement of ridge 33 and recess 25, it is possible to additionally apply an adhesive at the junction between plug 30 and container 10 to further secure the end part of cylindrical portion 31 in the open end 15 in order to provide a superior seal.

The chemical agent 2 may be of any kind of, for example, a herbicide or a fungicide, and in any form of, for example, a tablet, a powder, a jelly-like material, a pasty material, or a liquid.

Figure 7:
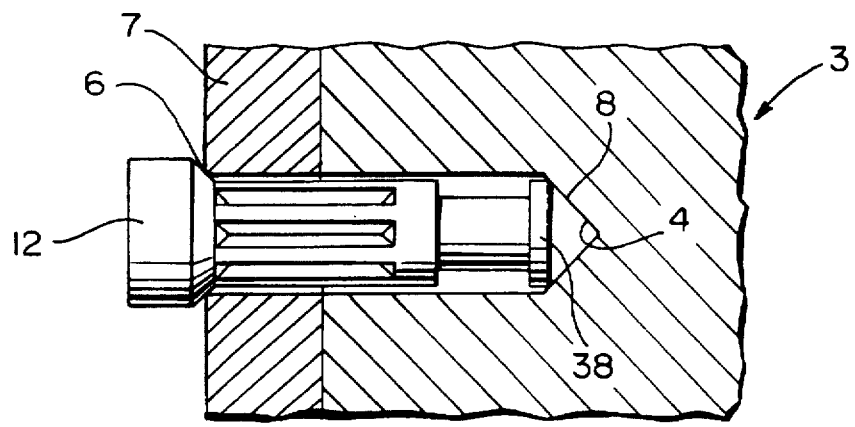
FIGS. 7 and 8 are views illustrating how the capsule of the present invention is used.
Figure 8:
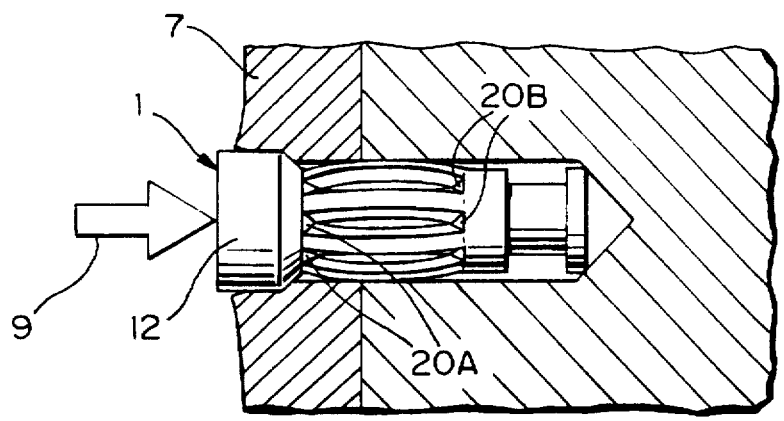

The assembled chemical agent containing capsule 1 is inserted into a pre-drilled bore 4 in the trunk of a tree 3 to be treated. As is seen in FIGS. 7 and 8, the bore 4 is dimensioned to extend through the bark 7 and into the phloem layer 8 of the tree 3. The bore 4 is further dimensioned to have an internal diameter between the external diameters of the shank portion 11 and head element 12, respectively, and a depth slightly greater than the length of the shank portion 11, including the plug 30. The capsule 1 is inserted into the bore 4 of the tree 3 until the flange 38 of the plug 30 abuts against a wall, for instance the bottom wall of the bore 4, as is shown in FIG. 7. This brings the tapered transitional portion 13 of the container 10 into contact with the circumferential edge 6 of the bore 4.

Impact force is applied to the head element 12 by, for example, hammering, in the direction shown by arrow 9, causing the head element 12 and the shank portion 11 of the container 10 to move toward the plug 30 such that the conical or otherwise inclined portion 32 slides along inclined end surfaces 24 of ribs 22. The inclined portion 32 of plug 30 acts as a cam and forces the ribs 22 to expand the central part of shank portion 11 radially outward and break the shank portion 11 along the slots 20 into strips 20A, as is shown in FIG. 8. The strips 20A form therebetween passages 20B to permit the chemical agent 2, if it is in a jelly-like or liquid form, to be released and mix with the sap of the tree 3, or to permit the sap of the tree 3, if the chemical agent is in the form of a tablet or a powder, to permeate and mix with the chemical agent 2. Because passages 20B are located in the central part of shank portion 11, they are more precisely aligned with the phloem layer of tree 3. The chemical contained in the capsule 1 is therefore more precisely released into this phloem layer.

Since the outer diameter of the head element 12 of the capsule 1 is larger than the inner diameter 6 of the originally pre-drilled bore 4, a very tight fit will be obtained between the head element 12 of the capsule 1 and the opening of the bore of the tree 3 after the impact force has been applied. This causes the capsule 1 to be held very firmly in the tree 3. The central parts of strips 20A formed from the shank portion 11 will also be pressed against the internal surface of the bore 4 and be frictionally engaged with the internal surface, so as to contribute to retention of the capsule 1 firmly in bore 4 of tree 3.

It is to be understood that although the invention has been described in detail with respect to a preferred embodiment, nevertheless, various other embodiments and variants are possible which are within the spirit and scope of the present invention, and such embodiments and variants are intended to be covered by the following claims.

What is claimed is:

1. A tree treatment capsule for insertion into a bore in a tree comprising:

a plastic container having a shank with an internal cavity having an end opening containing therein a chemical agent and a head element integrally formed with said shank remote from said end opening, said shank including a circumferential recess formed therein;

a plastic plug for sealingly closing said internal cavity, said plastic plug having an outer external diameter slightly smaller than the diameter of said end opening;

said plug having a circumferentially extending ridge formed thereon and receivable in said circumferential recess such that said plug is only partially insertable into said end opening and so as to provide a tight fit between said plug and said end opening;

said shank having a plurality of recessed slots which are formed in the exterior surface thereof at circumferentially equal spacings, said slots extending longitudinally along a central portion of said shank between said end opening and said head element and allowing said shank to be broken so that as an impact force applied to said head element moves said head element towards said plastic plug, said plastic plug expands said central portion of said shank and breaks said shank along said recessed slots into a plurality of strips to form passages between said strips, thereby allowing said chemical agent to pass from said internal cavity through said passages.

2. A tree treatment capsule as defined in claim 1, wherein said plastic container and said plastic plug are made of different plastic materials.

3. A tree treatment capsule as defined in claim 2, wherein said plastic container is made of polystyrene.

4. A tree treatment capsule as defined in claim 2, wherein said plastic plug is made of polyethylene.

5. A tree treatment capsule as defined in claim 1, wherein said head element has an internal cavity formed with a plurality of ribs in order to provide a strong head element structure.

6. A tree treatment capsule as defined in claim 5, wherein said ribs are integrally formed with said head element and extend cross-wise of said head element in a radial direction.

7. A tree treatment capsule as defined in claim 6, wherein said head element is shaped cylindrically.

8. A tree treatment capsule as defined in claim 1, wherein said plug has an internal cavity formed with a plurality of ribs in order to provide a strong plug structure.

9. A tree treatment capsule as defined in claim 8, wherein said head element is shaped cylindrically.

10. A tree treatment capsule as defined in claim 1, and further comprising a plurality of ribs, each having an inclined end surface and extending radially into said internal cavity from an inner surface of said shank and wherein said plug includes a tapered portion slidable along each inclined end surface to expand the central portion of said shank.

* * * * *